United States Patent
Perry

(10) Patent No.: US 6,831,847 B2
(45) Date of Patent: Dec. 14, 2004

(54) SYNCHRONOUS RECTIFIER DRIVE CIRCUIT AND POWER SUPPLY INCLUDING SAME

(75) Inventor: Marty Perry, Tucson, AZ (US)

(73) Assignee: Artesyn Technologies, Inc., Boca Raton, FL (US)

( * ) Notice: Subject to any disclaimer, the term of this patent is extended or adjusted under 35 U.S.C. 154(b) by 14 days.

(21) Appl. No.: 10/446,188

(22) Filed: May 27, 2003

(65) Prior Publication Data

US 2003/0235059 A1 Dec. 25, 2003

Related U.S. Application Data

(63) Continuation-in-part of application No. 09/716,506, filed on Nov. 20, 2000, now Pat. No. 6,570,268.

(51) Int. Cl.$^7$ .............................. H00M 3/335
(52) U.S. Cl. .............. 363/21.06; 363/17; 363/21.14; 363/26; 363/127
(58) Field of Search ................. 363/17, 21.06, 363/21.14, 26, 65, 67, 68, 89, 127

(56) References Cited

U.S. PATENT DOCUMENTS

| | | | |
|---|---|---|---|
| 5,274,539 A | * 12/1993 | Steigerwald et al. | .......... 363/20 |
| 5,625,541 A | 4/1997 | Rozman | |
| 5,663,877 A | 9/1997 | Dittli et al. | |
| 5,999,417 A | 12/1999 | Schlecht | |
| 6,011,703 A | 1/2000 | Boylan et al. | |
| 6,061,255 A | 5/2000 | Chik et al. | |
| 6,069,804 A | 5/2000 | Ingman et al. | |
| 6,091,616 A | 7/2000 | Jacobs et al. | |
| 6,130,828 A | * 10/2000 | Rozman | .................. 363/21.06 |
| 6,169,683 B1 | 1/2001 | Farrington | |
| 6,188,592 B1 | 2/2001 | Farrington et al. | |
| 6,256,214 B1 | 7/2001 | Farrington et al. | |
| 6,288,920 B1 | 9/2001 | Jacobs et al. | |
| 6,297,970 B2 | 10/2001 | Hemena et al. | |
| 6,330,169 B2 | 12/2001 | Mullett et al. | |
| 6,342,737 B1 | 1/2002 | Brodeur | |
| 6,370,044 B1 | 4/2002 | Zhang et al. | |
| 6,490,183 B2 | * 12/2002 | Zhang | .................. 363/89 |
| 6,535,400 B2 | 3/2003 | Bridge | |
| 6,570,268 B1 | * 5/2003 | Perry et al. | .................. 307/38 |
| 6,671,193 B1 | * 12/2003 | Pelkonen | .................. 363/53 |
| 6,747,880 B2 | * 6/2004 | Grover | .................. 363/21.06 |

* cited by examiner

Primary Examiner—Jeffrey Sterrett
(74) Attorney, Agent, or Firm—Kirkpatrick & Lockhart LLP

(57) ABSTRACT

A drive circuit for a synchronous rectifier of a switch mode power converter is disclosed. The switch mode power converter may include a main power transformer and a primary switch for cyclically coupling the main power transformer to an input source. The drive circuit may comprise a turn-on switch, a turn-off switch, a charge pump and a pulse transformer. The charge pump may be coupled to a secondary winding of the main power transformer. The turn-on switch is for turning on the synchronous rectifier and may be coupled to the charge pump. The pulse transformer may include primary and secondary windings, wherein the primary winding is responsive to a control signal supplied to the primary switch. The turn-off switch is for turning off the synchronous rectifier and may include a control terminal coupled to the secondary winding of the pulse transformer.

20 Claims, 9 Drawing Sheets

SYNCHRONOUS RECTIFIER DRIVE CIRCUIT AND POWER SUPPLY INCLUDING SAME

This application is a continuation-in-part of Ser. No. 09/716,506 filed Nov. 20, 2000 now U.S. Pat. No. 6,570,268.

BACKGROUND OF INVENTION

1. Field of Invention

The present invention relates generally to power conversion electronics and, more particularly, to synchronous rectifier drive circuits.

2. Description of the Background

DC-to-DC power converters are power processing circuits which convert an unregulated input DC voltage to a regulated DC output voltage. Switch-mode DC-to-DC power converters typically include an inverter, a transformer having a primary winding coupled to the inverter, and a rectifying circuit coupled to a secondary winding of the transformer. The inverter typically includes a switching device, such as a field effect transistor (FET), that converts the DC input voltage to an alternating voltage, which is magnetically coupled from the primary winding of the transformer to the secondary winding. The rectifying circuit rectifies the alternating voltage on the secondary winding to generate a desired DC output voltage.

It is known to use synchronous rectifiers (SRs) employing metal-oxide-semiconductor field effect transistors (MOSFETs) to convert the alternating voltage of the secondary winding to the unipolar DC output voltage. The advantage of synchronous rectification is that the forward voltage drop, and hence the power loss, across a MOSFET SR is much less than that of diode devices used in the rectifying circuit. Such SR circuits, however, typically require gate drive circuitry to render the MOSFET at a low resistance during forward conduction and, more importantly, to render it non-conductive during reverse bias. This is because, unlike a diode, a SR may be conductive in both directions (i.e., forward and reverse). Thus, if not properly controlled, reverse current can flow through a MOSFET SR, thereby negatively affecting the efficiency of the power converter.

One known technique to control the gate drive of a MOSFET SR is to couple the alternating voltage from the secondary winding of the transformer to the gate terminal of the MOSFET SR to thereby turn the device on and off in response to the voltage across the secondary winding. This scheme is commonly referred to as "self-driven synchronous rectification." Although usually effective, it is possible that when the voltage on the secondary winding reverses and the gate terminal of the SR is driven off, a delay in turn-off of the SR will provide a period of reverse current in the SR. This has a deleterious "shorting" effect on the secondary winding, which may limit the turn off voltage and further delay commutation of the SR. Additionally, it is difficult to generate the proper on-state SR bias level in the self-driven configuration.

Further drawbacks with self-driven SR schemes exist. Self-driven circuits typically do not provide sufficiently fast turn-on and turn-off the SR. Rather, self-driven circuits typically provide slowly rising and slowly falling gate signals that transition the SR through a linear region during which $I^2R$ losses are more significant. In addition, self-driven circuits do not achieve optimal timing. That is, for one, the turn-on current is not applied immediately after the SR becomes biased to conduct such that any conduction of the internal body diode of the SR is minimized, thereby reducing losses. This is because self-driven circuits rely on the winding voltage to turn on, and during the rise of current in the SR the winding voltage may be reduced by leakage inductance in the transformer. Also, proper timing of the SR suggests that the gate of the SR be discharged a small delay period before the voltage reverses across the SR. The delay period provides for the turn off time of the SR and ensures that the device is off when reverse bias is applied, preventing any flow of reverse current. Self-driven circuits, however, use the reverse bias voltage itself to initiate turn off and, therefore, no delay is possible. Thus, during the turn off time of the SR, reverse current may flow.

Additionally, self-driven circuits often do not provide a suitable gate voltage to the SR. Ideally, when turning the SR ON, the gate of the SR should receive sufficient voltage to lower the on resistance of the SR to the minimum value. But the gate voltage should not be so high as to damage the gate of the SR. In addition, the source of the voltage for the drive circuit should be referenced to the control terminal (i.e., gate) of the SR and should be able to supply a high pulse current. Self-driven circuits, however, require that the configuration of the SRs be adapted to match the available winding voltage. Further, the pulse current from the windings may be limited by the leakage inductance of the transformer. Furthermore, self-driven circuits apply the winding voltage directly to the gate of the SR. This voltage must be scaled to the converter output voltage, which may be either insufficient or extreme for the gate of the SR.

One known technique to overcome the shortcomings of self-driven synchronous rectifiers is to employ a gate drive circuit coupled to the control terminal of the synchronous rectifier (SR). Gate drive circuits, however, are complicated to implement, thus reducing reliability and increasing cost. Further, conventional gate drive circuits often do not overcome all of the drawbacks identified above for self-driven circuits, such as rapid turn on and turn off, proper timing, suitable gate voltage. In addition, it is difficult to implement a gate drive circuit driven by the alternating voltage of the transformer that is capable of driving two synchronous rectifiers of a dual output power converter or provide the proper bias levels in low voltage output converters.

Accordingly, there exists a need in the art for a SR gate drive circuit that achieves rapid turn on and turn off of the SR so as to reduce, and even obviate, the delay in turn-off of a SR, to thereby minimize, or eliminate, any period of reverse conduction of the SR and the subsequent shorting effect. There further exists a need for a gate drive circuit that is capable of providing the required SR bias level, even for low output converters.

SUMMARY OF THE INVENTION

In one general aspect, the present invention is directed to a drive circuit for a synchronous rectifier (SR) for a switch mode power converter. The power converter may include, as switch mode power converters do, a main power transformer and a primary switch for cyclically coupling an input source to the main power transformer. The primary switch may be controlled by a control signal, such as according to a pulse width modulation (PWM) scheme. The SR is for rectifying a voltage across the secondary of the main power transformer.

According to one embodiment, the drive circuit includes turn-on and turn-off switches, a charge pump and a pulse transformer. The turn-on switch is for turning on the SR during the intended time period of forward conduction. The turn-off switch is for turning off the SR. The charge pump is coupled to a secondary winding of the main power transformer and is used to provide drive and a power supply for the turn-on switch. The pulse transformer includes primary and secondary windings, wherein the primary winding is responsive to the control signal supplied to the primary switch and the secondary winding of the pulse transformer is coupled to the control terminal of the turn-off switch. The charge pump shifts the winding voltage to an appropriate reference level for the control terminal of the SR. The number of turns on the secondary winding of the main power transformer can be adapted to match the charge pump output to the requirement of the SR gate. That is, the drive voltage of the charge pump may be higher or lower than the converter output.

As will be apparent from the following description, embodiments of the present invention provide a SR drive circuit that achieves rapid turn on and turn off, with proper timing, and with a suitable voltage level for the SR, with simplicity that increases reliability and decreases cost. For example, the drive circuit of the present invention provides an advantage over prior art self-driven synchronous rectification schemes because it provides a manner for eliminating delay in the turn-off of a synchronous rectifier, thus providing the advantage of eliminating the shorting effect of the secondary winding of the transformer. Embodiments of the present invention also provide the advantage of having a mechanized synchronous rectifier turn-on system operable at, for example, low output voltages.

According to another embodiment, the present invention is directed to a power converter including the drive circuit for a synchronous rectifier. The power converter may be any type of power converter including a synchronous rectifier including but not limited to forward converters, flyback converters, and double ended converters such as, for example half-bridge converters, full-bridge converter and push-pull converters.

DESCRIPTION OF THE FIGURES

For the present invention to be clearly understood and readily practiced, embodiments of the present invention will be described in conjunction with the following figures, wherein.

DETAILED DESCRIPTION OF THE INVENTION

Figure 1:
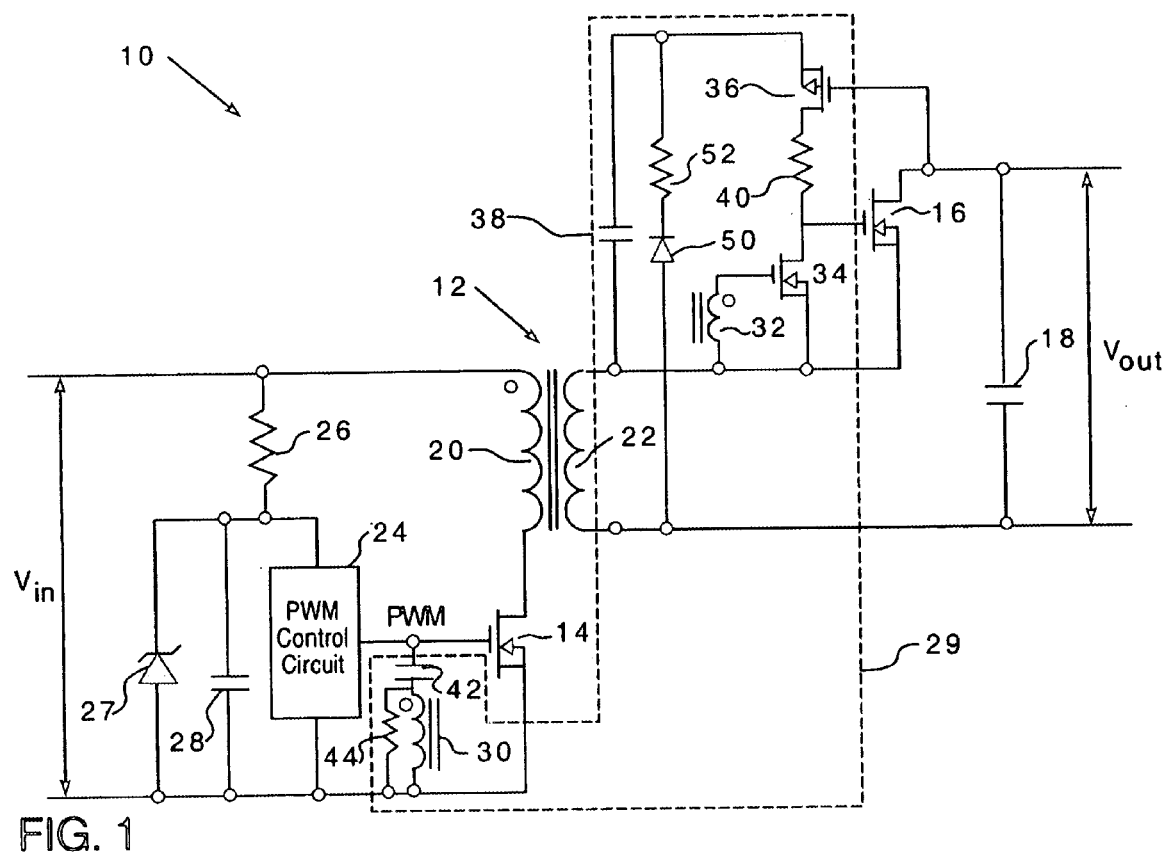
FIG. 1 is a schematic diagram of a power converter circuit according to one embodiment of the present invention.

FIG. 1 is a schematic diagram of a power converter circuit 10 according to one embodiment of the present invention. The power converter circuit 10 includes an isolation transformer 12, a primary power switch 14, a synchronous rectifier (SR) 16, and an output capacitor 18. The SR may be, for example, a MOSFET, such as an n-channel MOSFET as illustrated in FIG. 1. The isolation transformer includes a primary winding 20 and a secondary winding 22. The primary power switch 14 may be, for example, a transistor, such as an n-channel MOSFET as illustrated in FIG. 1. The primary power switch 14 cyclically couples the input voltage ($V_{in}$) from a voltage source (not shown) to the primary winding 20 of the transformer 12 to generate an alternating voltage at the secondary winding 22. This alternating voltage is converted to a DC voltage by the SR 16, producing a filtered DC output voltage ($V_{out}$) across the output capacitor 18, which is used to power a load (not shown).

The duty cycle of the primary power switch 14 is controlled by a pulse width modulated (PWM) signal output from a PWM control circuit 24. When the primary power switch 14 is closed, i.e., when the PWM signal drives the primary power switch 14 into conduction, the input voltage $V_{in}$ is coupled to the primary winding 20, causing current in the primary winding 20 to increase linearly and causing energy to be stored within the transformer 12. During this time period, the SR 16 is non-conductive, as described further hereinbelow, and the output capacitor 18 supplies the load current. Accordingly, the output capacitor 18 may be chosen to have a capacitance large enough in order that it provides sufficient load current during the period that the SR 16 is non-conductive.

When the primary power switch 14 is opened, i.e., when the PWM signal drives the primary switch 14 into non-conduction, the energy stored in the transformer 12 is transferred to the secondary of the power converter circuit 10. The SR 16 is turned on, as discussed hereinbelow, causing load current to flow through the SR 16. The secondary current of the power converter 10, i.e., the forward current through the SR 16, decreases linearly until this interval terminates as determined by the particular operating point of the converter 10.

Accordingly, by regulating the duty cycle of the PMW signal, the output voltage $V_{out}$ may be controlled. According to one embodiment, the PWM control circuit 24 may be responsive to the output voltage $V_{out}$ and regulate the PWM signal based on the output voltage $V_{out}$ to realize a desired output. As illustrated in FIG. 1, the PWM control circuit 24 may receive power from the input voltage $V_{in}$ via a resistor 26, which may be regulated by a Zener diode 27 and filtered by a capacitor 28.

Conduction of the SR 16 is controlled by a gate drive circuit 29. According to one embodiment, as illustrated in FIG. 1, the gate drive circuit 29 includes a pulse transformer, having a primary winding 30 magnetically coupled to a second winding 32, but which are shown detached in FIG. 1 for clarity. The gate drive circuit 29 also includes a turn-off switch 34 and a turn-on switch 36. Both switches 34, 36 may be transistors such as, for example, MOSFETs. According to one embodiment, as illustrated in FIG. 1, the switch 34 may be an n-channel MOSFET and the switch 36 may be a p-channel MOSFET. According to other embodiments described below, the drive circuit may include a charge pump for driving the turn-on switch 36. The SR drive circuit described herein may be used in any type of converter topology employing a synchronous rectifier(s).

The switch 34 may provide a conduction path between the secondary winding 22 of the isolation transformer 12 and the gate terminal of the SR 16. In addition, the control terminal of the switch 34 may be coupled to the secondary winding 32 of the pulse transformer. The switch 36 may also provide a conduction path between the secondary winding 22 of the isolation transformer 12 and the gate terminal of the SR 16, although a capacitor 38 may be provided between the secondary winding 22 and the switch 36, and a resistor 40 may be provided between the switch 36 and the gate terminal of the SR 16. The control terminal of the switch 36 may be coupled to the drain terminal of the SR MOSFET 16.

The primary winding 30 of the pulse transformer may be pulsed with the PWM signal from the PWM control circuit 24 via a capacitor 42. In addition, a resistor 44 may be shunt loaded with the primary winding 30. The capacitor 42 and resistor 44 may form a differentiator circuit, discussed further hereinbelow.

The operation of the gate drive circuit 29 of FIG. 1 will be discussed in conjunction with the idealized voltage waveform diagrams of FIGS. 2a–c. FIG. 2a is a diagram showing the gate-source voltage of the primary power switch 14. FIG. 2b is a diagram showing the gate-source voltage of the switch 34. FIG. 2c is a diagram showing the gate-source voltage of the SR 16. The duty cycle of the PWM signal is $(t_1-t_0)/(t_2-t_0)$.

According to one embodiment, when the primary power switch 14 is closed, the capacitor 38 is charged to $V_{in}/N$, where N is the turns ratio of the transformer 12. When the primary power switch 14 is opened at $t_1$, the polarity of the voltage at the secondary winding 22 of the transformer 12 will reverse. This will forward bias the intrinsic body diode of the SR 16 and cause the switch 36 to conduct, thereby driving the gate terminal of the SR 16 to turn on the SR 16.

When the primary power switch 14 is then turned on at $t_2$ by the PWM signal of the PWM control circuit 24, the PWM signal is differentiated by the differentiator circuit comprising the capacitor 42 and the resistor 44, and the differentiated PWM signal is applied to the primary winding 30 of the pulse transformer. The switch 34 is therefore instantaneously turned on by the voltage across the secondary winding 32 of the pulse transformer. The turning-on of the switch 34 turns off the SR 16 and shunts drive current from the switch 36, limited by the resistor 40, away from the gate terminal of the SR 16. In this interval, the primary power switch 14 turns on, causing the voltage on the primary winding 20 of the isolation transformer 12 to reverse.

Subsequently, the voltage at the secondary winding 22 reverses, and because the SR 16 has been turned off, the possibility of reverse current through the SR 16 is eliminated and shorting of the secondary winding 22 is prevented. As reverse voltage appears across the SR 16, the switch 36 may be turned off, thus removing the drive current from the gate terminal of the SR 16 and limiting further dissipation in the resistor 40. With the switch 36 turned off, no drive is available for the SR 16, and the switch 34 is turned off by the decay of the differential pulse at its gate terminal.

The values of the capacitor 42 and the resistor 44 of the differentiator circuit may be chosen such that the differential time constant provided by the differentiator circuit is long enough to keep the switch 34 turned on during the switching interval, but short enough to not significantly reduce the volt-second product applied across the pulse transformer.

According to one embodiment, as illustrated in FIG. 1, power for the gate drive circuit 29 may be derived from the secondary winding 22 of the isolation transformer 12 through a diode 50 and a resistor 52. Drive energy may be stored in the capacitor 38, allowing the on-time of the SR 16 to be non-responsive to the magnitude of the voltage at the secondary winding 22. Consequently, in contrast to prior art self-driven synchronous rectification schemes, the present invention does not use the secondary voltage to directly drive the SR 16. According to another embodiment, a bias voltage supply may be used to provide steady drive power to the SR 16.

Figure 3:
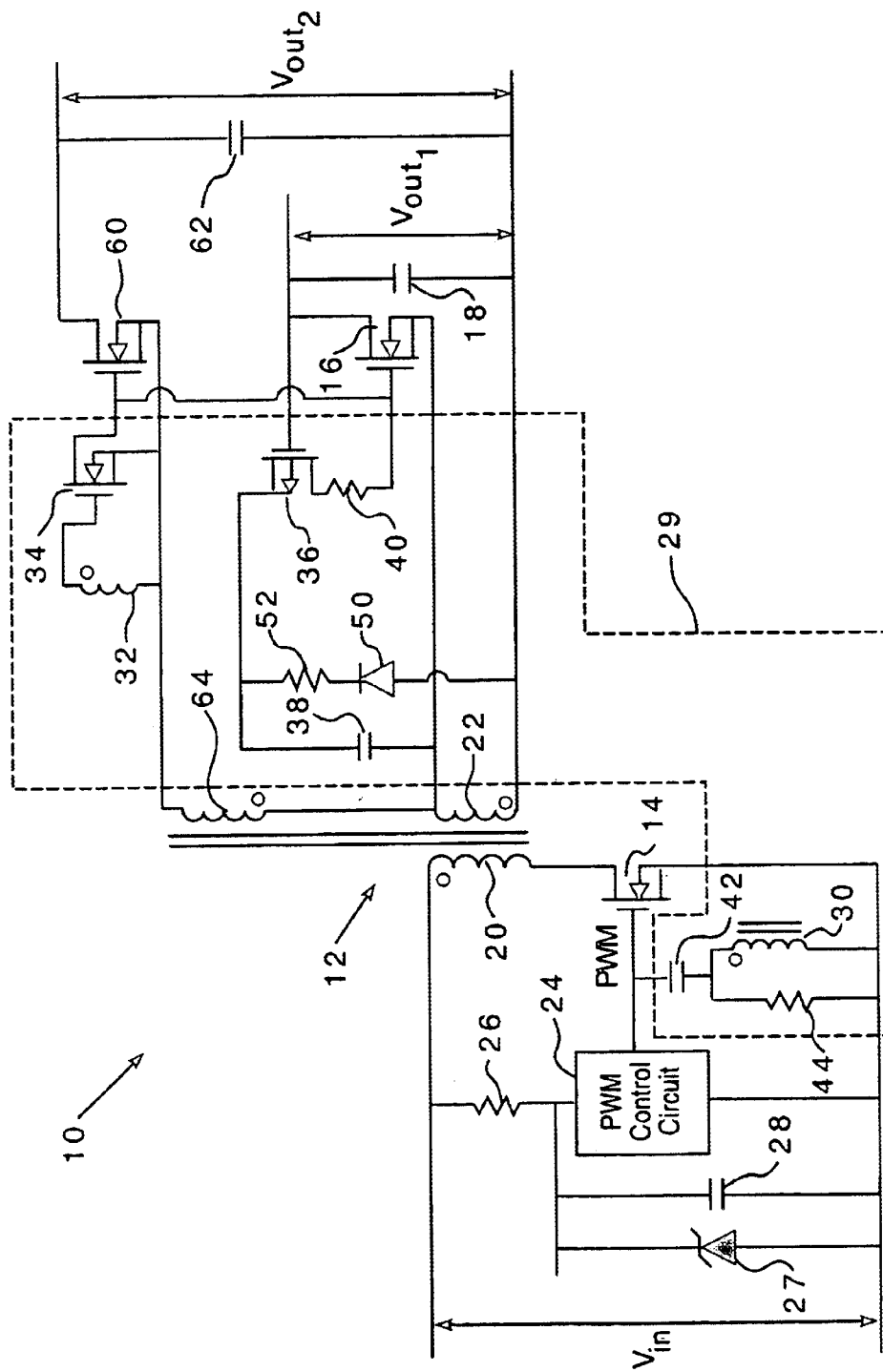
FIG. 3 is a schematic diagram of a power converter circuit according to another embodiment of the present invention.

FIG. 3 is a schematic diagram of the power converter circuit 10 according to another embodiment of the present invention. The power converter circuit 10 illustrated in FIG. 10 is similar to that of FIG. 1, except that it provides a dual output ($V_{out1}$ and $V_{out2}$). The illustrated embodiment includes a second SR 60 and a second output capacitor 62. In addition, the transformer 12 may include a second secondary winding 64. The second SR 60 may be, for example, a MOSFET, as illustrated in FIG. 3.

The cyclic switching of the primary power switch 14 additionally generates an alternating voltage across the second secondary winding 64. This alternating voltage is converted to a DC voltage by the second SR 60, producing a filtered DC output voltage ($V_{out2}$) across the output capacitor 62 to power a second load (not shown).

The gate drive circuit 29 described hereinbefore may drive each of the SRs 16, 60. According to such an embodiment, the gate terminal of the second SR 60 may be coupled to the gate terminal of the first SR 16. Consequently, as described hereinbefore with respect to FIGS. 1 and 2, as a reverse voltage appears across the SR 60 due to the polarity of the second secondary winding 64, the switch 36 may be turned off, thus removing the drive current from the gate terminal of the SR 60. With the switch 36 turned off, no drive is available for the SR 60, and the switch 34 is turned off by the decay of the differential pulse at its gate terminal.

Figure 4:
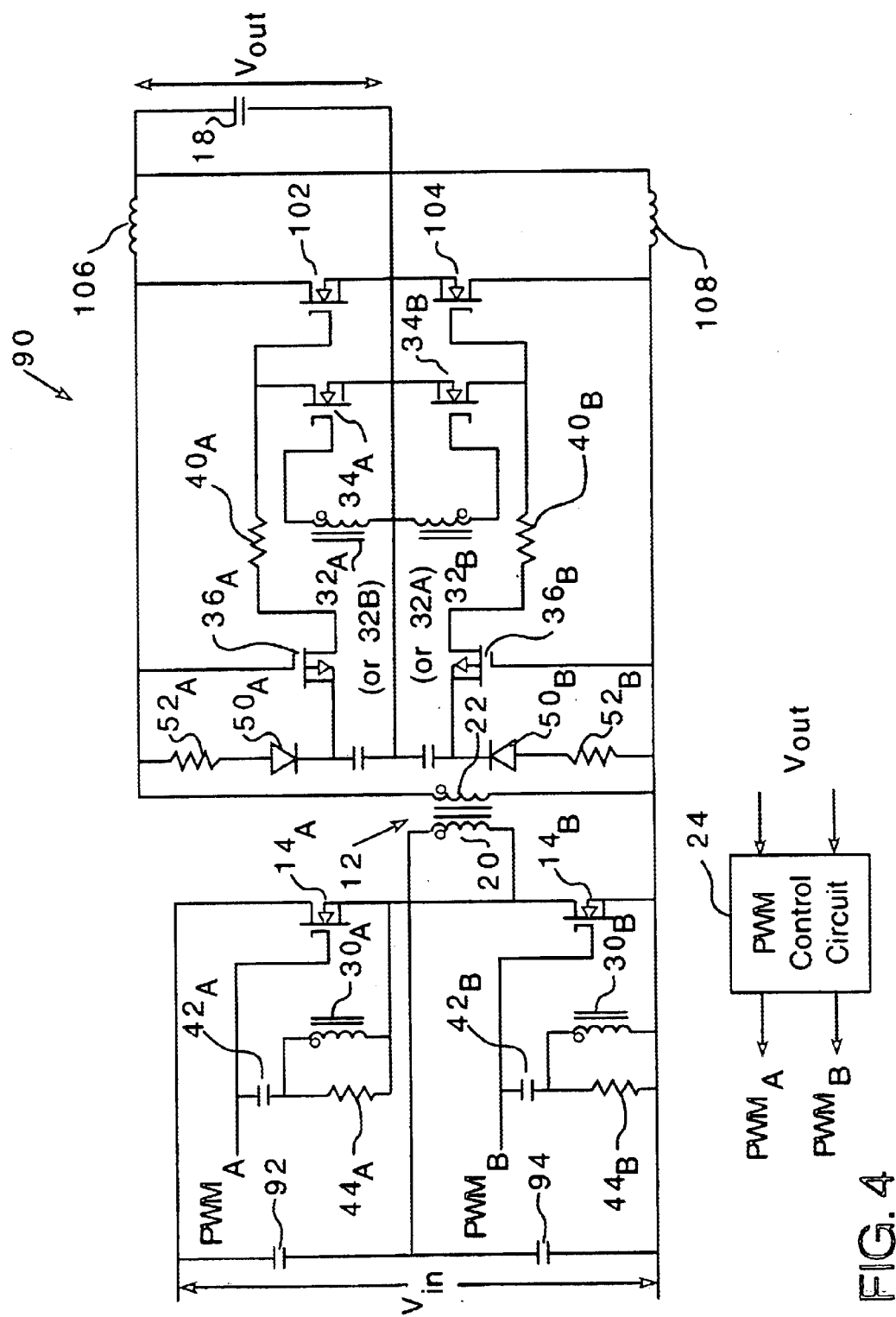
FIG. 4 is a schematic diagram of a power converter circuit according to another embodiment of the present invention.

The power converter circuit 10 of FIGS. 1 and 3 utilizes a flyback topology. Benefits of the gate drive circuit 29 of the present invention, however, may be realized with other types of power conversion topologies. For example, FIG. 4 is a schematic diagram of a half-bridge power converter circuit 90 with a current doubler including a gate drive circuit according to an embodiment of the present invention. The circuit 90 includes two series-connected capacitors 92, 94 connected across the input voltage source ($V_{in}$). The primary winding 20 of the isolation transformer 12 may be coupled between a common node the two capacitors 92, 94 and a common node of the two primary input power switches $14_A$, $14_B$.

The secondary of the circuit 90 includes two SRs 102, 104, which may be, for example, MOSFETs as illustrated in FIG. 4. The SRs 102, 104 may alternately convert an alternating voltage across the secondary winding 22 of the isolation transformer 12 to produce a regulated DC output voltage $V_{out}$ across the output capacitor 18. A pair of output inductors 106, 108, in conjunction with the output capacitor 18, may filter the DC voltages generated by the SRs 102, 104.

The illustrated half-bridge power converter circuit 90 includes two gate drive circuits to respectively control the drive supplied to each of the SRs 102, 104. Similar to the gate drive circuits described hereinbefore, the first gate drive circuit of circuit 90, which controls the gate drive for the first SR 102, may include a pulse transformer including a primary winding $30_A$ and a secondary winding $32_A$. The first gate drive circuit may also include first and second switches $34_A$ and $36_A$ coupled by a resistor $40_A$. In addition, as discussed hereinbefore, a differentiator circuit comprising a capacitor $42_A$ and a resistor $44_A$ may differentiate a first PWM signal, $PWM_A$, which controls the switching of the first primary power switch $14_A$.

Similarly, the second gate drive circuit, which controls the drive supplied to the second SR 104, may include a second pulse transformer including a primary winding $30_B$ and a secondary winding $32_B$, a pair of switches $34_B$ and $36_B$ coupled by a resistor $40_B$, and a differentiator circuit comprising a capacitor $42_B$ and a resistor $44_B$.

Figure 2:
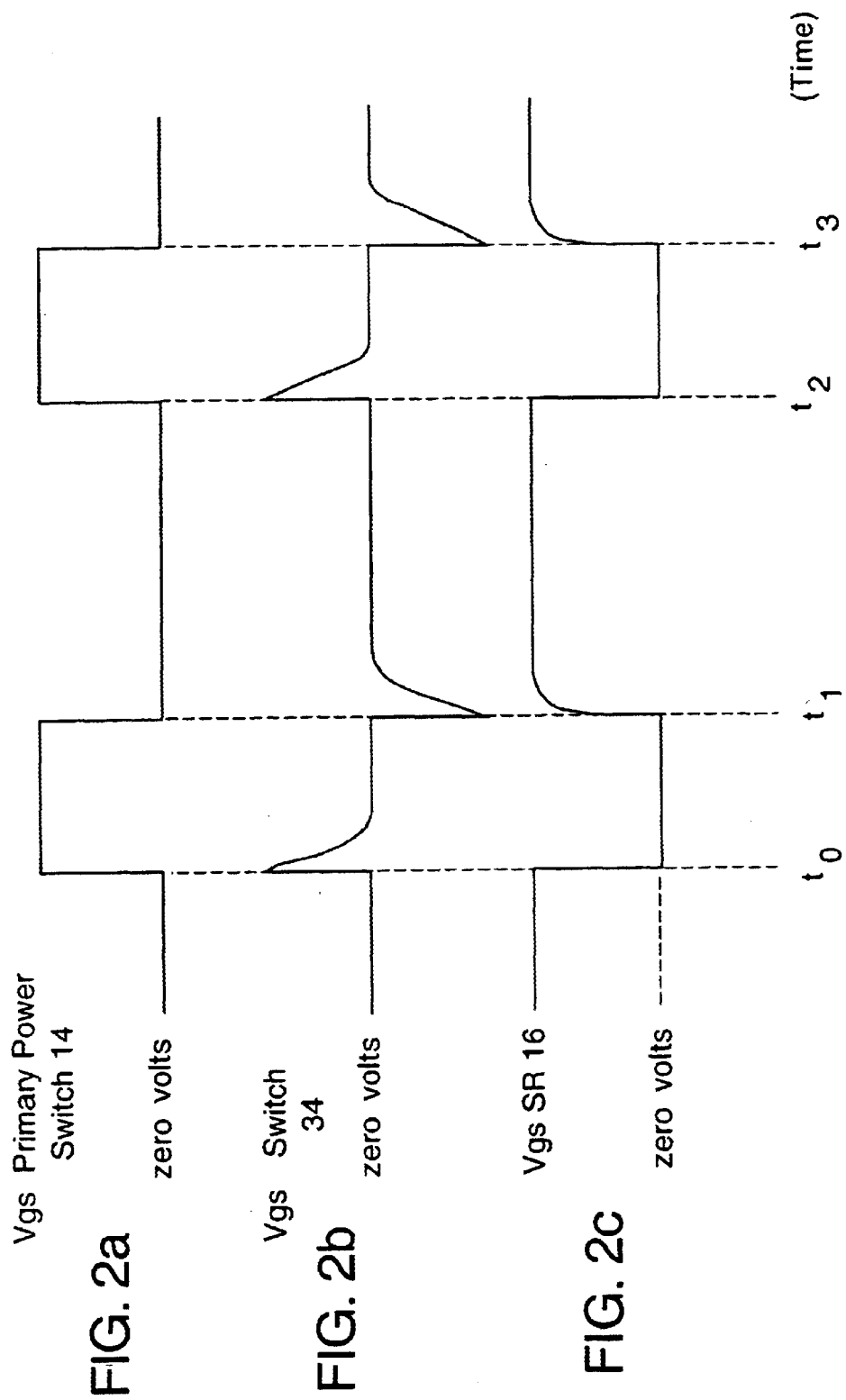
FIGS. 2a–c are voltage waveform diagrams illustrating the operation of the power converter circuit of FIG. 1 according to one embodiment of the present invention.

In a manner analogous to that described hereinbefore with respect to FIGS. 1 and 2, the first and second drive circuits may respectively prevent the SRs 102, 104 from conducting reverse current, thereby preventing the shorting effect of the secondary winding 22, except that for a half-bridge configuration, as illustrated in FIG. 4, the SRs 102, 104 may be turned off only during the interval that the opposite primary power switches $14_A$, $14_B$ are turned on. That is, the SR 102 may be turned off only for the interval that primary power switch $14_B$ is turned on, and the SR 104 may be turned off only for the interval that primary power switch $14_A$ is turned on. This may be realized in the half-bridge circuit 90 because the secondary winding 22 of the isolation transformer 12 has the same polarity as the primary winding 20.

Power for each of the gate drive circuits may be derived from the secondary winding 22 of the isolation transformer 12, for the first gate drive circuit, through a diode $50_A$ and a resistor $52_A$, and for the second gate drive circuit, through a diode $50_B$ and a resistor $50_B$.

Figure 5:
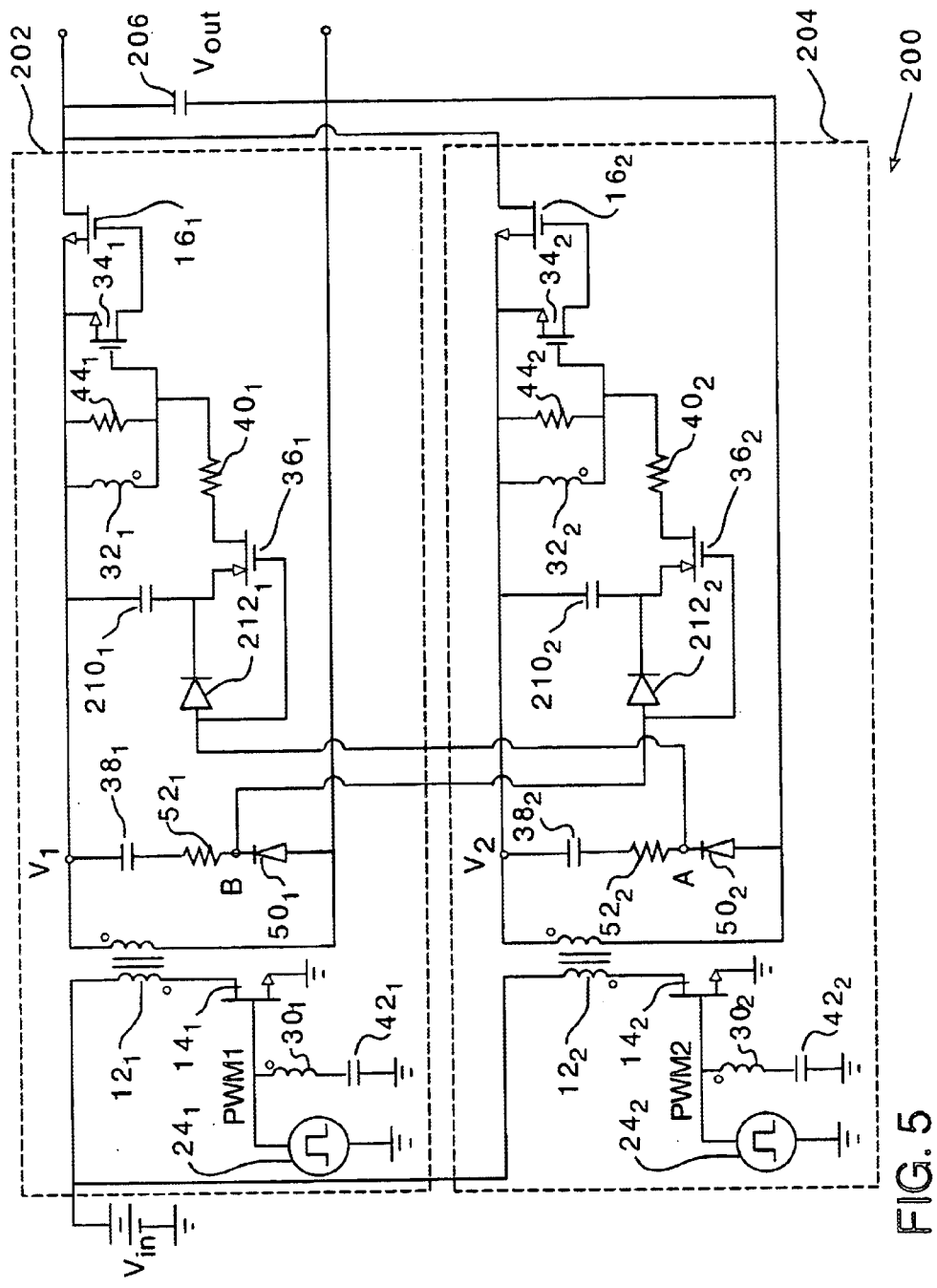
FIG. 5 is a schematic diagram of a power supply according to another embodiment of the present invention.

FIG. 5 is a diagram of a power supply 200 according to another embodiment of the present invention. The power supply 200 illustrated in FIG. 5 includes two parallel-connected converters 202, 204. The converters 202, 204 may be, for example, flyback converters sharing a common output capacitor 206. Each converter 202, 204 may be similar to the converter 10 described hereinbefore with respect to FIG. 1, including an isolation transformer $12_{1-2}$, a primary power switch $14_{1-2}$, a synchronous rectifier $16_{1-2}$, and a PWM control circuit $24_{1-2}$. The PWM signals PWM1 and PWM2 from the respective PWM control circuits $24_{1-2}$ may be, for example, 180 degrees out of phase such that the parallel-connected converters 202, 204 operate in an interleaved mode.

Similarly, each converter 202, 204 may include a gate drive circuit as described hereinbefore including, for example, a pulse transformer including a primary winding $30_{1-2}$ and a secondary winding $32_{1-2}$, a differential circuit including a capacitor $42_{1-2}$ and a resistor $44_{1-2}$ (in FIG. 5 the resistors $44_{1-2}$ are shown in parallel across the secondary windings $30_{1-2}$ of the pulse transformers), switches $34_{1-2}$, $36_{1-2}$, and a resistor $40_{1-2}$. In addition, each converter 202, 204 may include a capacitor $38_{1-2}$, a resistor $52_{1-2}$, and a diode $50_{1-2}$ connected across the secondary winding of the isolation transformer $12_{1-2}$.

In contrast to the converter 10 described hereinbefore, the turn-on function for the synchronous rectifiers $16_{1-2}$ of the converters 202, 204 may be mechanized by use of a cross-coupled charge pump arrangement. According to one such embodiment, each converter 202, 204 may include a capacitor $210_{1-2}$ and a diode $212_{1-2}$. The diode $212_1$ may be connected between the diode $50_2$ and the source terminal of the switch $36_1$. The capacitor $210_1$ may be connected between the source terminal of the switch $36_1$ and the secondary winding of the transformer $12_1$. The gate terminal of the switch $36_1$ may also be connected to the diode $50_2$.

Similarly, the diode $212_2$ may be connected between the diode $50_1$ and the source terminal of the switch $36_2$, and the capacitor $210_2$ may be connected between the source terminal of the switch $36_2$ and the secondary winding of the transformer $12_2$. The gate terminal of the switch $36_2$ may also be connected to the diode $50_1$.

The charge pump for the synchronous rectifier $16_1$ of the converter 202 may include the capacitors $38_2$, $210_1$, the diodes $50_2$, $212_1$, and the resistor $52_2$. Similarly, the charge pump for the synchronous rectifier $16_2$ of the converter 204 may include the capacitors $38_1$, $210_2$, the diodes $50_1$, $212_2$, and the resistor $52_1$. The resistors $52_{1-2}$ may provide a current limit function during the charge pump conversion intervals.

The power supply 200 of FIG. 5 may be beneficial, for example, for low output voltage applications. For example, for a low output voltage converter, the turns ratio of the isolation transformers may be sufficiently high that the appropriate drive level to forward bias the synchronous rectifier cannot be developed for all input voltage conditions of Vin. As described hereinbelow, the cross-coupled charge pump arrangement may yield the required synchronous rectifier drive levels and gating functions when using high step-down ratios as are ordinarily required for optimized low voltage output converters.

FIGS. 6a–f illustrate idealized voltage waveforms for the power supply 200 at an arbitrary operating point. FIG. 6a is a diagram of the PWM signal from the first PWM control circuit $24_1$ (PWM1). FIG. 6b is a diagram of the PWM signal from the second PWM control circuit $24_2$ (PWM2). FIG. 6c is a diagram of the voltage at a node ($V_1$) in the converter 202 between the capacitor $38_1$ and the secondary winding of the transformer $12_1$. FIG. 6d is a diagram of the voltage at a node ($V_2$) in the converter 204 between the capacitor $38_2$ and the secondary winding of the transformer $12_2$. FIG. 6e is a diagram of the gate-source voltage of the transistor $36_1$. And FIG. 6f is a diagram of the gate-source voltage of the transistor $36_2$.

From FIGS. 6a–f, it is recognized than when the signal PWM2 is high, the capacitor $38_2$ is charged to a voltage of Vin/N, where N is the turns ratio of the transformers $12_{1-2}$. Subsequently, the signal PWM2 goes low prior to the signal PWM1 going high. This causes the voltage at the node "A" of the converter 204 to become $(V_{in}/N)+V_{out}$. When the signal PWM1 goes high, the capacitor $210_1$ is charged via the capacitor $38_2$, the diode $212_1$ and the transformer $12_1$ to a value of $(2V_{in}/N)+V_{out}$. By appropriate selection of these values, this voltage may be suitable over all line conditions (i.e., input voltages Vin) and during a short circuit (i.e., $V_{out}=0$) to forward bias the synchronous rectifier $16_1$.

Turn-on of the synchronous rectifier $16_1$ may be accomplished by the turn-on switch $36_1$. During the interval where PWM1 is high, the node voltage $V_1$ is at $-V_{in}/N$. Thus, the gate-source voltage ($V_{gs}$) of the p-channel switch $36_1$ equals:

$$((V_{in}/N)+V_{out})-((2V_{in}/N)+V_{out}-(V_{in}/N))=0.$$

As such, the switch $36_1$ is in a non-conducting state. When PWM1 goes low, the voltage at node B of the converter 202 will be forced to $V_{out}$. As such, the gate-source voltage ($V_{gs}$) of the switch $36_1$ will be forced to $-V_{in}/N$. Thus, the switch $36_1$ will be in a conducting state and will transfer charge from the capacitor $210_1$ to the synchronous rectifier $16_1$, forcing the synchronous rectifier $16_1$ into the conducting third quadrant state. During the interval when PWM2 goes high, the switch $36_1$ is biased on to the entire charge pump level of 2($V_{in}$+$V_{out}$). Because the synchronous rectifier $16_1$ is already conductive, this has no effect in the conduction interval.

Turn-off and turn-on of the synchronous rectifier $16_2$ may be accomplished in an analogous manner and is, therefore, not further described herein.

Figure 7:
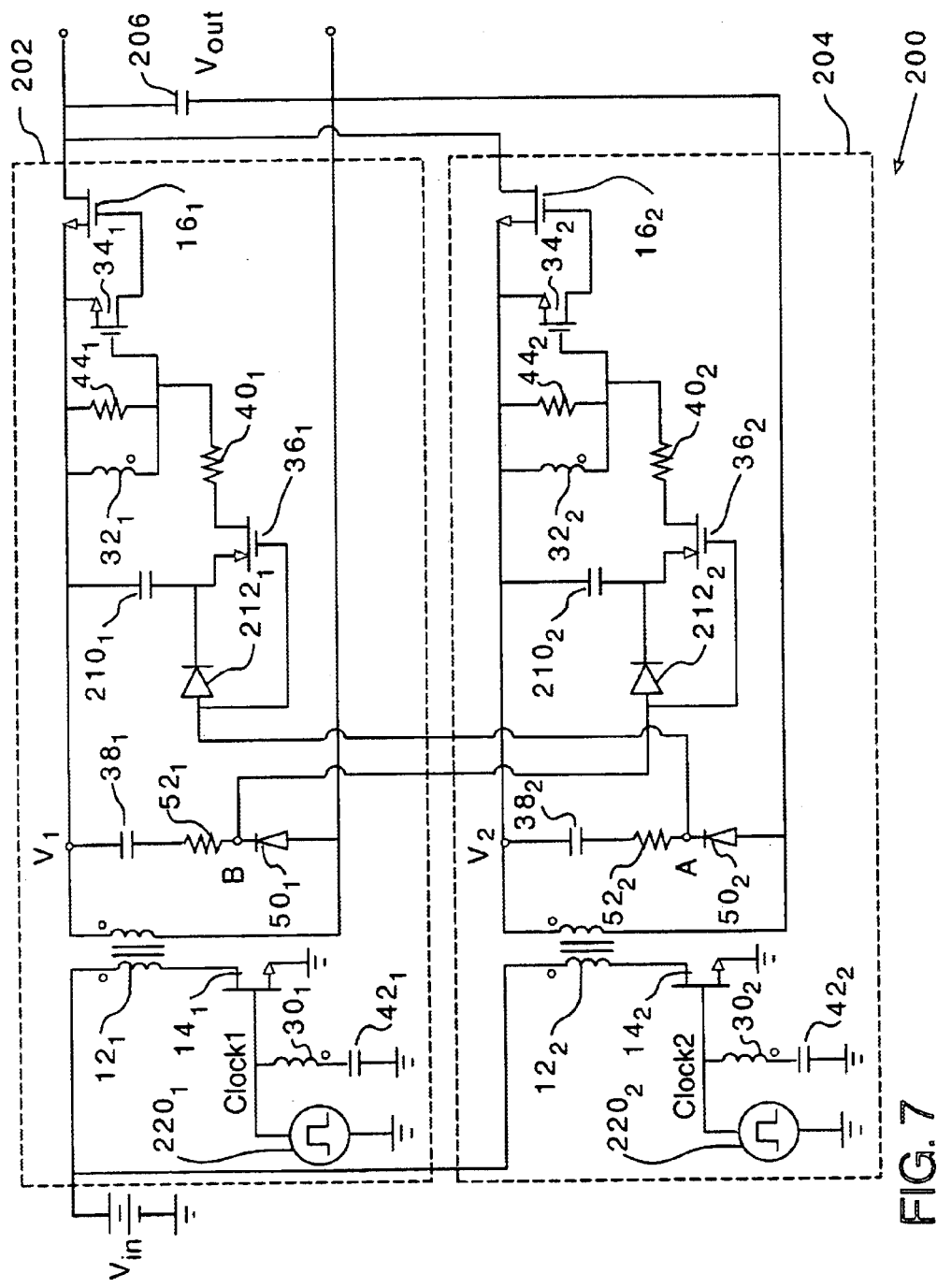
FIG. 7 is a schematic diagram of a power supply according to another embodiment of the present invention.

FIG. 7 is a diagram of the power supply 200 according to another embodiment of the present invention. The power supply 200 is similar to that of FIG. 5, except that the transformers $12_{1-2}$ are forward-mode transformers and that the drive signals to the primary power switches $16_{1-2}$ are supplied by first and second clock circuits $220_{1-2}$ respectively. The signals from the first and second clock circuits $220_{1-2}$ (CLOCK1 and CLOCK2) may be, for example, 180 degrees out of phase but with some overlapping high period. Thus, for the overlapping interval, both the transformers $12_{1-2}$ deliver energy to the output at the same time. In addition, for the power supply 200 of FIG. 7, the pulse transformer sense may be reversed (i.e., the polarities of the primary windings $30_{1-2}$ and the secondary windings $32_{1-2}$ of the pulse transformers are the same) since the transformers $12_{1-2}$ operate in the forward mode.

Figure 8:
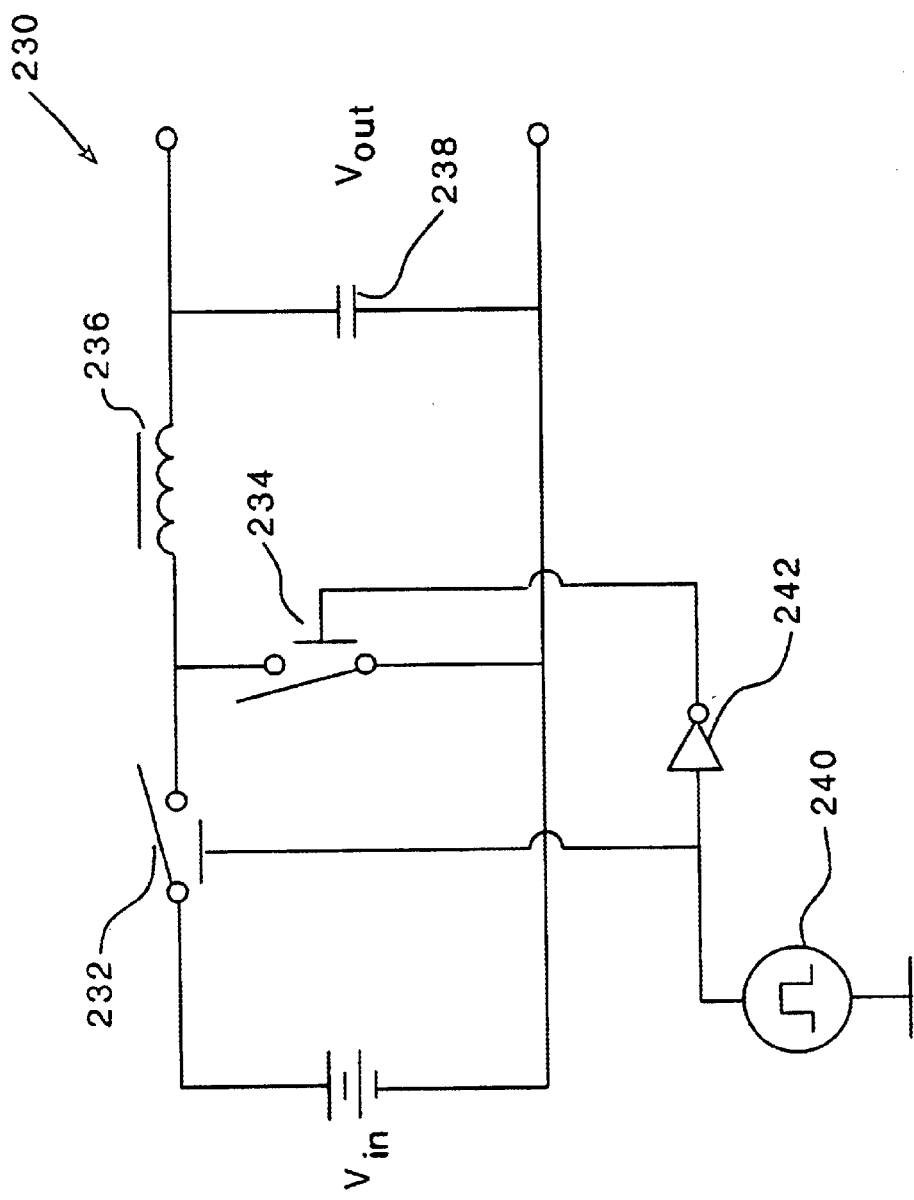
FIG. 8 is a schematic diagram of a synchronous buck converter that may be used in conjunction with the power supply of FIG. 7 according to one embodiment of the present invention.

According to one embodiment, the input voltage Vin for the power supply 200 of FIG. 7 may be supplied by, for example, a synchronous buck converter, as illustrated in FIG. 8. The synchronous buck converter 230 of FIG. 8 includes two switches 232, 234, and inductor 236, and a capacitor 238. The switches 232, 234 may be, for example, transistors such as, for example, bipolar junction transistors or field effect transistors. The voltage across the capacitor 238 (Vout) may be the input voltage (Vin) for the power supply 200 of FIG. 7. The switches 232, 234 may be driven by PWM control circuit 240, which may be responsive to the output voltage Vout of the power supply 200 of FIG. 7, to thereby regulate the output voltage of the power supply 200. An inverter 242 may be connected between the PWM control circuit 240 and the switch 234 such that the switches 232, 234 are oppositely driven.

Figure 9:
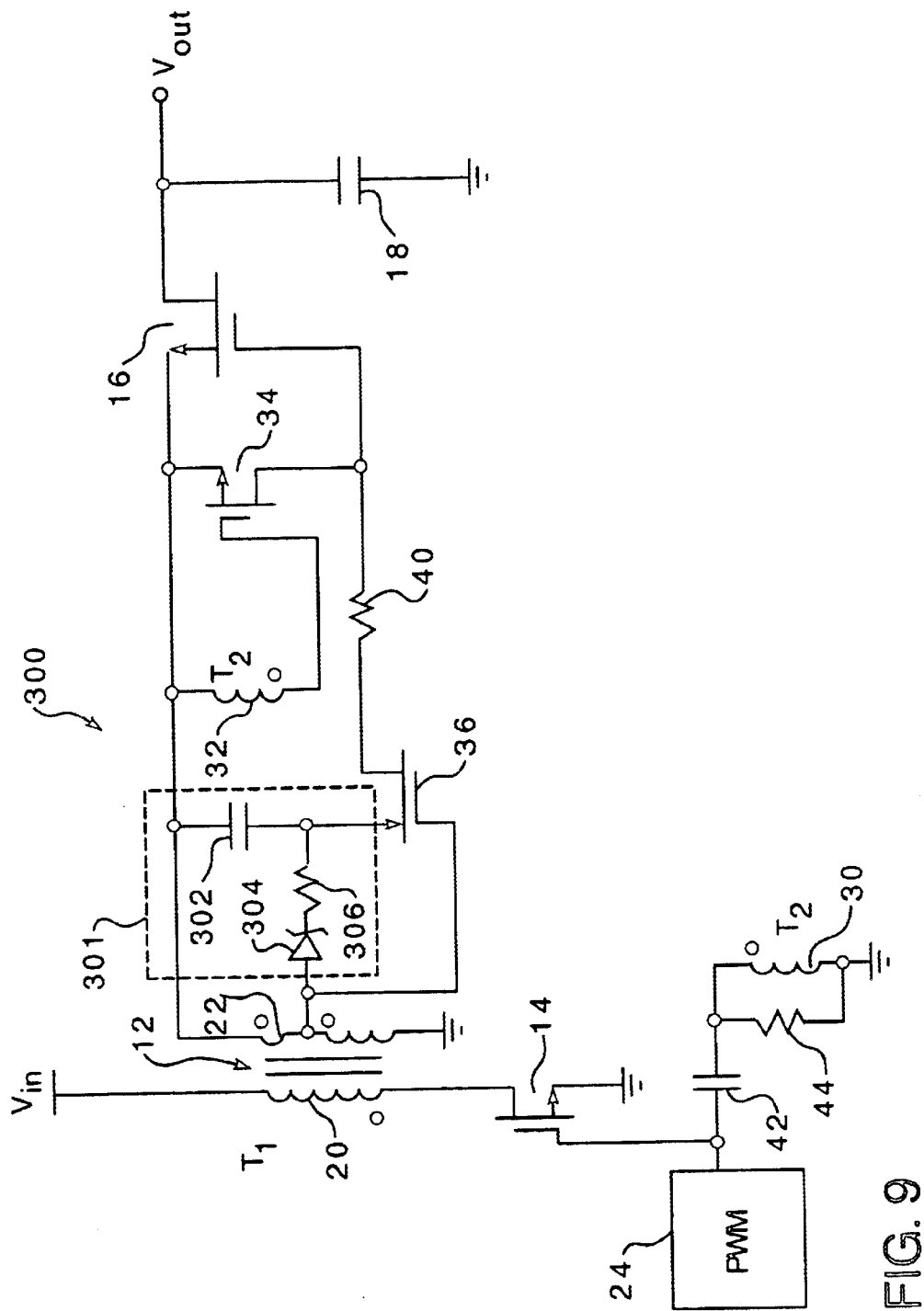
FIG. 9 is a schematic diagram of a power supply according to another embodiment of the present invention.

FIG. 9 is a schematic diagram of a converter 300 according to another embodiment of the present invention. The converter 300 includes a SR 16 and a drive circuit for driving the SR 16. The drive circuit includes the turn-on and turn-off switches 36, 34, the pulse transformer comprising windings 30 and 32, and a charge pump circuit 301, comprising capacitor 302 and diode 304. The converter 300 illustrated in FIG. 9 is a flyback converter, although the drive circuit for driving the synchronous rectifier 16 may be used in other converter topologies including, but not limited to, forward converters, half-bridge converters, full-bridge converter and push-pull converters.

In operation, similar to the operation of the converter described previously in connection with FIG. 1, at the instant the primary switch 14 is turned ON by the PWM control circuit 24, the turn-off switch 34 of the drive circuit is driven to conduction by the pulse transformer (windings 30, 32), and SR 16 is turned OFF. The resistor 40 connected to the drains of the turn-on switch 36 and the turn-off switch 34 limits cross-conduction between the two switches 34, 36 that may result if both switches are simultaneously ON. The operation is described previously in paragraphs 23 and 24. The switching operation of the turn-off switch 34 is described previously, such as at paragraphs 23–25. Subsequently, the voltage on the secondary winding 22 reverses and the SR 16 is then OFF to block reverse current flow. During this period, the diode 304 conducts to charge the charge pump capacitor 302 to the secondary winding voltage. When the primary switch 14 is turned OFF by the control circuit 24, the voltage on the secondary winding 22 begins to reverse again; the pulse transformer is inactive during this time. As the secondary winding 22 voltage rises, the charge pump capacitor 302 carries the source terminal of the turn-on switch 36 to a voltage above the output voltage ($V_{out}$). The gate terminal of the turn-on switch 36, which may be a p-type device as illustrated in FIG. 9, may be held to the output voltage ($V_{out}$) or to the voltage at a tap on the main power transformer 12, as described below. When the voltage between the terminals exceeds the threshold voltage of the switch 36, the switch 36 turns on to turn on the SR 16.

As shown in FIG. 9, the secondary winding of the transformer 12 may be tapped to provide the appropriate voltage for the charge pump capacitor 302. The number of turns between the tap and the winding end may be chosen to provide a suitable voltage for the gate of the SR 16. Further, as shown in FIG. 9, the gate of the turn-on switch 36 may be connected to the anode of the charge pump diode 302 instead of the output voltage. This may prevent excessive voltage from appearing at the gate of the turn-on switch 36 during the ON period of the primary switch 14. In addition, the circuit may include a resistor 306 in series with the diode 304 to limit the current through the diode 304 into the charge pump capacitor 302.

Figure 6:
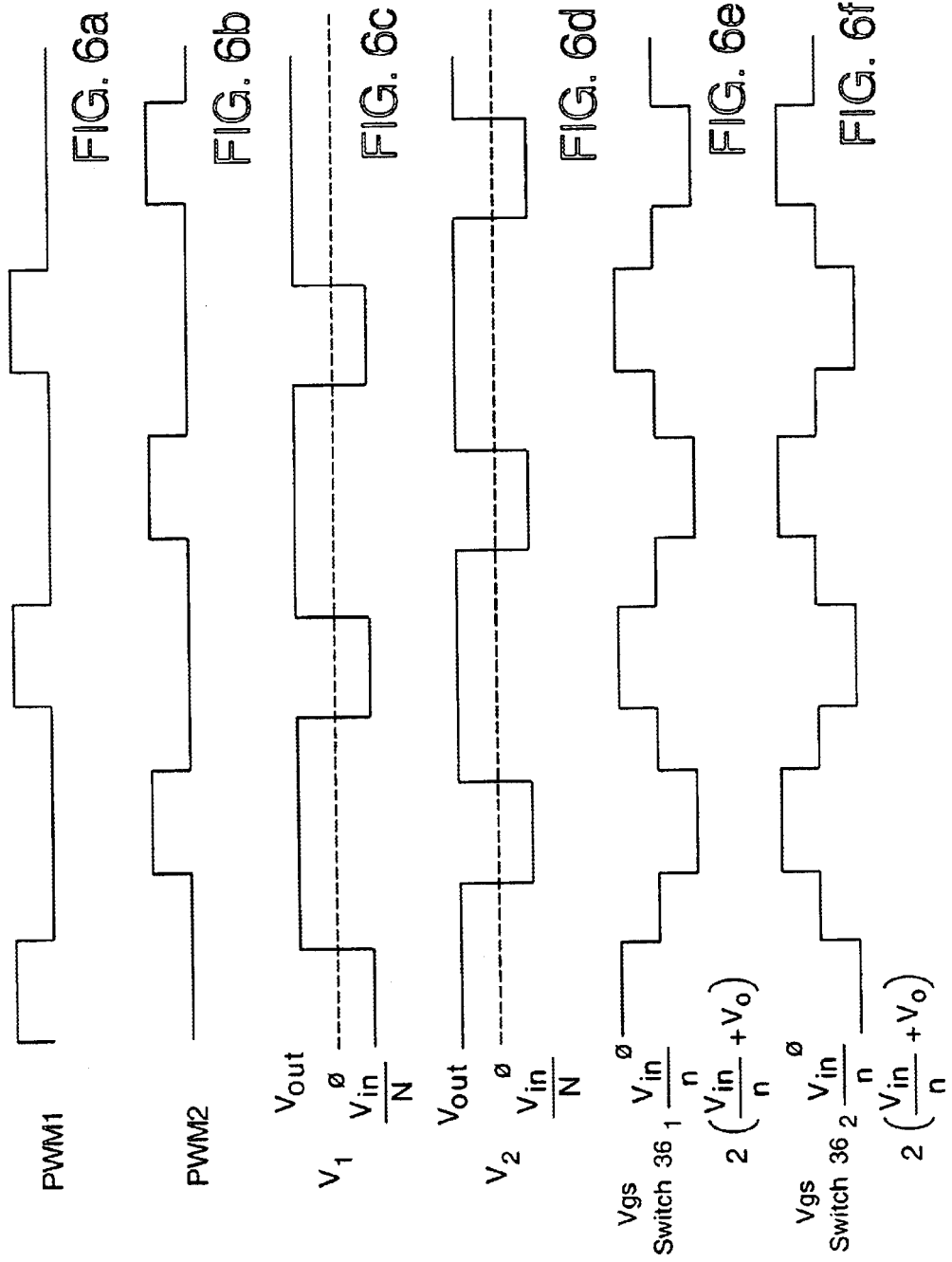
FIGS. 6a–f are voltage waveform diagrams illustrating the operation of the power supply of FIG. 5 according to one embodiment of the present invention.

As shown in FIGS. 5–7, a cross-coupled charge pump arrangement may be used for paralleled converters. Without the cross coupling of the charge pumps, the charge pump voltage may be too low to provide adequate drive to the SRs. By cross-coupling the charge pumps between the two converters, as shown in FIGS. 5 and 7, the output voltage may be added to the charge pump capacitor.

As is apparent from the above-description, embodiments of the drive circuit of the present invention provide the advantage of creating a reservoir of stored energy for turn on of the SR and initiate the turn-on current based on forward bias of the SR 16. Thus, conduction by the body diode of the SR is minimized, thereby reducing losses. Also, turn off the SR may be initiated through a fast pulse transformer at a time determined by the control signal for the primary switch 14, and the secondary winding voltage does not begin to charge until the turn-on delay of the primary switch 14. Therefore, at least turn-on delay of the primary switch 14 may compensate for the turn-off delay of the SRs. In addition to this delay, the leakage inductance of the transformer 12 and transition time of the secondary voltage may create additional small delays that ensure that the SRs are off before the reverse voltage is applied. Further, embodiments of the present invention may provide high performance, reliability and simplicity because they combine discrete drive switches 34, 36 with a reliable charge pump circuit 301 and small pulse transformer.

Although the present invention has been described herein with respect to certain embodiments, those of ordinary skill in the art will recognize that many modifications and variations of the present invention may be implemented. For example, the isolation transformer 12 may include multiple primary, secondary, or tertiary windings. In addition, the power converter circuit 10 may a mechanism for resetting the core of the transformer 12. The foregoing description and the following claims are intended to cover all such modifications and variations.

What is claimed is:

1. A drive circuit for a synchronous rectifier of a switch mode power converter, wherein the power converter includes a main power transformer and a primary switch for cyclically coupling the main power transformer to an input source, the drive circuit comprising:

a charge pump coupled to a secondary winding of the main power transformer;

a turn-on switch for turning on the synchronous rectifier, wherein the turn-on switch is coupled to the charge pump;

a pulse transformer having primary and secondary windings, wherein the primary winding is responsive to a control signal supplied to the primary switch; and a turn-off switch for turning off the synchronous rectifier, wherein the turn-off switch includes a control terminal coupled to the secondary winding of the pulse transformer.

2. The drive circuit of claim 1, wherein the charge pump is for providing drive and a power supply for the turn-on switch.

3. The drive circuit of claim 1, wherein the charge pump includes a capacitor and a diode.

4. The drive circuit of claim 3, wherein:
the main power transformer includes first and second secondary windings connected in series at a common node; and
the turn-on switch includes a FET having a source terminal, a drain terminal and a gate terminal, wherein the gate terminal is coupled to the common node between the first and second secondary windings of the main power transformer and the drain terminal is coupled to the control terminal of the synchronous rectifier.

5. The drive circuit of claim 4, wherein the diode of the charge pump includes an anode terminal coupled to the common node of between the first and second secondary windings of the main power transformer and a cathode terminal coupled to the source terminal of the turn-on switch.

6. The drive circuit of claim 5, wherein:
the first secondary winding of the main power transformer includes a first terminal opposite the common node between the first and second secondary windings, wherein the synchronous rectifier is coupled to the first terminal of the first secondary winding; and
the capacitor of the charge pump is coupled between the first terminal of the first secondary winding and the source terminal of the turn-on switch.

7. The drive circuit of claim 6, further comprising a differentiator circuit coupled to the pulse transformer.

8. The drive circuit of claim 7, wherein the differentiator circuit includes:
a capacitor connected to the primary winding of the pulse transformer; and
a resistor connected in parallel with the primary winding of the pulse transformer.

9. The drive circuit of claim 1, further comprising a differentiator circuit coupled to the pulse transformer.

10. The drive circuit of claim 9, wherein the differentiator circuit includes:
a capacitor connected to the primary winding of the pulse transformer; and
a resistor connected in parallel with the primary winding of the pulse transformer.

11. The drive circuit of claim 1, wherein the power converter includes first and second paralleled power converters, each paralleled power converter including a synchronous rectifier, a main power transformer, and a primary switch for cyclically coupling the input voltage to the main power transformer, wherein:
the charge pump for the drive circuit for the first power converter is coupled to the secondary winding of the main power transformer of the second power converter; and
the charge pump for the drive circuit for the second power converter is coupled to the secondary winding of the main power transformer of the first power converter.

12. The drive circuit of claim 11, wherein the first and second power converters are interleaved.

13. The drive circuit of claim 1, wherein the switch mode power converter is selected from the group consisting of a forward converter, a flyback converter, a half-bridge converter, a full-bridge converter and a push-pull converter.

14. A power converter, comprising:
a main power transformer;
a synchronous rectifier coupled to a secondary winding of the main power transformer for rectifying a voltage across the secondary winding;
a primary switch for cyclically coupling an input voltage to a primary winding of the main power transformer; and
a drive circuit for driving the synchronous rectifier, the drive circuit comprising:
a charge pump coupled to the secondary winding of the main power transformer;
a turn-on switch for turning on the synchronous rectifier, wherein the turn-on switch is coupled to the charge pump;
a pulse transformer having primary and secondary windings, wherein the primary winding is responsive to a control signal supplied to the primary switch; and
a turn-off switch for turning off the synchronous rectifier, wherein the turn-off switch includes a control terminal coupled to the secondary winding of the pulse transformer.

15. The power converter of claim 14, wherein the charge pump is for providing drive and a power supply for the turn-on switch.

16. The power converter of claim 14, wherein the charge pump includes a capacitor and a diode.

17. The power converter of claim 16, wherein:
the main power transformer includes first and second secondary windings connected in series at a common node; and
the turn-on switch includes a FET having a source terminal, a drain terminal and a gate terminal, wherein the gate terminal is coupled to the common node between the first and second secondary windings of the main power transformer and the drain terminal is coupled to the control terminal of the synchronous rectifier.

18. The power converter of claim 17, wherein the diode of the charge pump includes an anode terminal coupled to the common node of between the first and second secondary windings of the main power transformer and a cathode terminal coupled to the source terminal of the turn-on switch.

19. The power converter of claim 18, wherein:
the first secondary winding of the main power transformer includes a first terminal opposite the common node between the first and second secondary windings, wherein the synchronous rectifier is coupled to the first terminal of the first secondary winding; and
the capacitor of the charge pump is coupled between the first terminal of the first secondary winding and the source terminal of the turn-on switch.

20. The power converter of claim 14, further comprising a differentiator circuit coupled to the pulse transformer.

* * * * *